US00RE40886E

(19) United States
(12) Reissued Patent
Sugimoto et al.

(10) Patent Number: US RE40,886 E
(45) Date of Reissued Patent: Sep. 1, 2009

(54) FUEL INJECTION VALVE FOR AN INTERNAL COMBUSTION ENGINE

(75) Inventors: Tomojiro Sugimoto, Susono (JP); Keiso Takeda, Mishima (JP)

(73) Assignee: Toyota Jidosha Kabushiki Kaisha, Toyota-shi (JP)

(21) Appl. No.: 10/878,686

(22) Filed: Jun. 29, 2004

Related U.S. Patent Documents

Reissue of:
(64) Patent No.: 6,161,780
Issued: Dec. 19, 2000
Appl. No.: 09/094,286
Filed: Jun. 9, 1998

(30) Foreign Application Priority Data

Jun. 25, 1997 (JP) ..... 9-169007

(51) Int. Cl.
*F02M 61/00* (2006.01)

(52) U.S. Cl. ..... 239/533.12; 239/558
(58) Field of Classification Search ..... 239/533.14, 239/533.12, 585.1, 585.3, 585.4, 585.5, 533.2, 239/590.3, 575, 596, 558, 88; 251/118, 129.15
See application file for complete search history.

(56) References Cited

U.S. PATENT DOCUMENTS

| | | | | | |
|---|---|---|---|---|---|
| 2,382,151 | A | * | 8/1945 | Harper, Jr. | 239/558 |
| 4,057,190 | A | * | 11/1977 | Kiwior et al. | 239/558 |
| 4,621,772 | A | * | 11/1986 | Blythe et al. | 239/585.4 |
| 4,646,974 | A | * | 3/1987 | Sofianek et al. | 239/463 |
| 4,865,001 | A | * | 9/1989 | Jensen | 123/525 |
| 4,903,898 | A | * | 2/1990 | Kind | 239/533.12 |
| 5,329,908 | A | * | 7/1994 | Tarr et al. | 123/527 |
| 5,577,481 | A | | 11/1996 | Wahba | |
| 5,762,272 | A | * | 6/1998 | Tani et al. | 239/543 |
| 5,921,473 | A | * | 7/1999 | Romann | 239/533.2 |

FOREIGN PATENT DOCUMENTS

| | | | | |
|---|---|---|---|---|
| DE | 32 29 716 A1 | | 2/1984 | |
| DE | 198 27 219 A1 | | 1/1999 | |
| EP | 0 740 071 A2 | | 10/1996 | |
| GB | 400836 | * | 11/1933 | |
| GB | 1214595 | * | 12/1970 | 239/533.12 |
| JP | 58-1905568 | * | 11/1983 | |
| JP | 61-135979 | * | 6/1986 | |
| JP | 264767 | * | 3/1990 | |
| JP | 3-117672 | * | 5/1991 | |
| JP | 7-127550 | * | 5/1995 | |
| JP | 8-218986 | * | 8/1996 | |
| JP | 9-32695 | * | 2/1997 | |

OTHER PUBLICATIONS

German Official Communication dated Apr. 20, 2005 with translation thereof.

* cited by examiner

*Primary Examiner*—Davis D Hwu
(74) *Attorney, Agent, or Firm*—Kenyon & Kenyon LLP

(57) ABSTRACT

A fuel jet adjusting plate has first nozzle holes arranged along a first circle coaxial with a central axis of a valve body and second nozzle holes arranged along a second circle coaxial with the central axis and having a diameter larger that the first circle. The second nozzle holes have an opening area smaller than that of the first nozzle holes. Thus, despite the fact that fuel flows at a lower rate upstream of inlet portions of the second nozzle holes than upstream of inlet portions of the first nozzle holes, it is possible to suitably atomize both the fuel spray injected through the first nozzle holes and the fuel spray injected through the second nozzle holes

3 Claims, 4 Drawing Sheets

FUEL INJECTION VALVE FOR AN INTERNAL COMBUSTION ENGINE

Matter enclosed in heavy brackets [ ] appears in the original patent but forms no part of this reissue specification; matter printed in italics indicates the additions made by reissue.

FIELD OF THE INVENTION

The present invention relates to a fuel injection valve for an internal combustion engine.

BACKGROUND OF THE INVENTION

A fuel injection valve for an internal combustion engine equipped with a fuel jet adjusting plate for atomizing injected fuel is conventionally known. The fuel jet adjusting plate has nozzle holes arranged along circles coaxial with a central axis of a valve body. This type of fuel injection valve for an internal combustion engine is disclosed, for instance, in Japanese Patent Application Laid-Open No. HEI 7-127550. This technology employs a large number of nozzle holes arranged along two circles coaxial with the central axis of the valve body.

FIG. 6 is a partial plan view of the fuel jet adjusting plate of the conventional fuel injection valve for an internal combustion engine. Referring to FIG. 6, reference character L0' denotes the central axis of the valve body, C1' a first circle coaxial with the central axis L0° C2' a second circle coaxial with the central axis L0' and having a diameter larger than that of the first circle, H1' first nozzle holes arranged at predetermined intervals along the first circle C1', and H2' second nozzle holes arranged at predetermined intervals along the second circle C2'. FIG. 7 is a sectional view taken along line VI—VI in FIG. 6. Referring to FIG. 7, reference character 1' denotes the fuel jet adjusting plate, F1' fuel spray injected through the first nozzle holes H1', F2' fuel spray injected through the second nozzle holes H2', D1' a diameter of the first nozzle holes H1', and D2' a diameter of the second nozzle holes H2'. As can be seen from FIGS. 6 and 7, fuel flows toward the central axis L0' in a radially outside-to-inside direction as indicated by blank arrows and is then injected through the nozzle holes H2', H2'. The fuel jet adjusting plate atomizes the fuel thus injected.

However, the flow rate of fuel becomes higher in the radially outside-to-inside direction. Thus, if the diameter D1' of the first nozzle holes H1' is equal to the diameter D2' of the second nozzle holes H2', the fuel spray F2' injected through the second nozzle holes H2' is not atomized as suitably as the fuel spray F1' injected through the first nozzle holes H1'. In this case, the fuel spray F2' has a large particle diameter and may even take the shape of a column as illustrated in FIG. 7. Thus, it is impossible to suitably atomize the fuel spray F2', whereby the performance of an internal combustion engine on which the fuel injection valve is mounted deteriorates.

SUMMARY OF THE INVENTION

The present invention has been devised in consideration of the aforementioned problems. It is thus an object of the present invention to provide a fuel injection valve capable of preventing deterioration of an internal combustion engine on which the fuel injection valve is mounted by suitably atomizing both fuel spray injected through radially outside nozzle holes and fuel spray injected through radially inside nozzle holes.

In order to achieve the aforementioned object, a first aspect of the present invention provides a fuel injection valve for an internal combustion engine including a valve body driven by a driving device between an open position and a closed position, a fuel jet adjusting plate for atomizing fuel injected when the valve body assumes the open position, a plurality of first nozzle holes formed in the fuel jet adjusting plate and arranged along a first circle coaxial with a central axis of the valve body, and a plurality of second nozzle holes formed in the fuel jet adjusting plate arranged along a second circle coaxial with the central axis and having a diameter larger than that of the circle, the second nozzle holes having an opening area smaller than that of the first nozzle holes.

In the first aspect of the present invention, the first nozzle holes arranged along the first, inner circle have an opening area larger than that of the second nozzle holes arranged the second, outer circle diameter. Thus, despite the fact that fuel flows at a lower rate upstream of the inlet portions of the second nozzle holes as compared to that upstream of the inlet portions of the first nozzle holes, it is possible to suitably atomize both the fuel spray injected through the first nozzle holes and the fuel spray injected through the second nozzle holes. Hence, preventing deterioration of the performance of an internal combustion engine on which the fuel injection valve is mounted.

In addition to the features of the first aspect of the present invention, a second aspect thereof proposes that an angle formed between hole axes of the first nozzle holes and a plane of the fuel jet adjusting plate be different from an angle formed between hole axes of the second nozzle holes and the plane of the fuel jet adjusting plate. Thus, the fuel spray injected through the first nozzle holes and the fuel spray injected through the second nozzle holes splash in different directions. As a result, it is possible to stabilize the fuel spray injected through the respective nozzle holes and suitably atomize the injected fuel.

In addition to the features of the second aspect of the present invention, a third aspect thereof proposes that an acute angle formed between the hole axes of the second nozzle holes and a plane perpendicular to the central axis be smaller than an acute angle formed between the hole axes of the first nozzle holes and the plane perpendicular to the central axis.

In the third aspect of the present invention, the fuel spray injected through the first nozzle holes is directed away from the fuel spray injected through the second nozzle holes. Therefore, the fuel spray injected through the first nozzle holes does not interfere with the fuel spray injected through the second nozzle holes. As a result, it is possible to stabilize the fuel spray injected through the respective nozzle holes and suitably atomize the injected fuel.

BRIEF DESCRIPTION OF THE DRAWINGS

Further objects, features and advantages of the present invention will become apparent from the following description of preferred embodiments with reference to the accompanying drawings, wherein.

DESCRIPTION OF PREFERRED EMBODIMENTS

Figure 1:
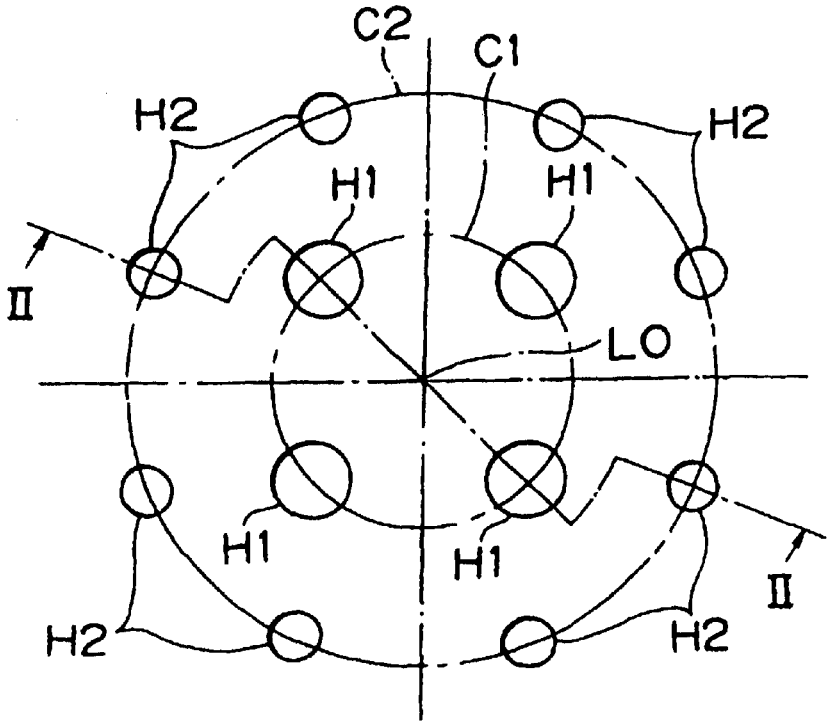
FIG. 1 is a partial plan view of a fuel jet adjusting plate of a fuel injection valve for an internal combustion engine according to a first embodiment of the present invention.
Figure 2:
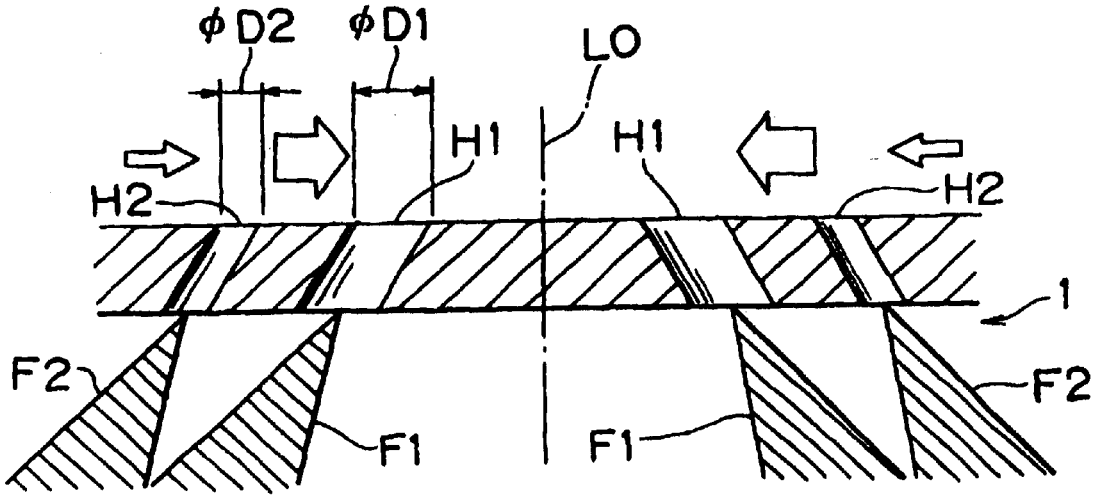
FIG. 2 is a sectional view taken along line II—II in FIG. 1.
Figure 3:
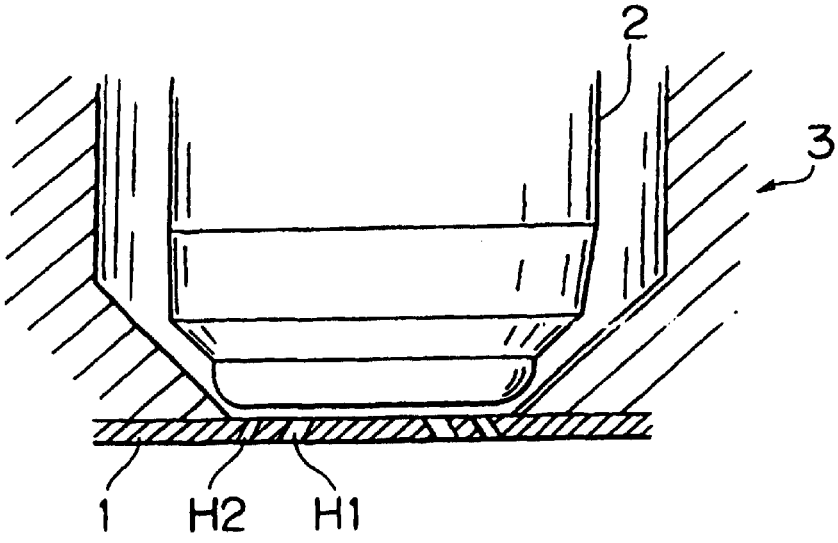
FIG. 3 is a partial sectional view of the fuel injection valve for an internal combustion engine of the first embodiment.

Preferred embodiments of the present invention will hereinafter be described with reference to the accompanying drawings. FIG. 1 is a partial plan view of a fuel jet adjusting plate of a fuel injection valve for an internal combustion engine according to a first embodiment of the present invention, the fuel jet adjusting plate having nozzle holes arranged along two circles coaxial with a central axis of a valve body. Referring to FIG. 1, reference character L0 denotes the central axis of the valve body, C1 a first circle coaxial with the central axis L0, C2 a second circle coaxial with the central axis L0 and having a diameter larger than the first circle, H1 first nozzle holes arranged at predetermined intervals along the first circle C1, and H2 second nozzle holes arranged at predetermined intervals along the second circle C2. FIG. 2 is a sectional view taken along line II—II in FIG. 1. Referring to FIG. 2, reference character 1 denotes a fuel jet adjusting plate, F1 fuel spray injected through the first nozzle holes H1, F2 fuel spray injected through the second nozzle holes H2, D1 a diameter of the first nozzle holes H1, and D2 a diameter of the second nozzle holes H2. FIG. 3 is a partial sectional view of a fuel injection valve for an internal combustion engine according to this embodiment, the fuel jet adjusting plate 1 being attached to the fuel injection valve. Referring to FIG. 3, reference character 2 denotes the valve body and reference character 3 a valve seat.

As can be seen from FIG. 3, the valve body 2 is disposed above the fuel jet adjusting plate 1 and driven by driving means (not shown) between an open position and a closed position. When the valve body 2 assumes the open position, fuel supplied from top to bottom in FIG. 2 reaches a location immediately upstream of the fuel jet adjusting plate 1 and flows toward the central axis L0, that is, in a radially outside-to-inside direction (See blank arrows in FIG. 2). In this case, the fuel flows toward the central axis L0 at a lower rate upstream of inlet portions of the nozzle holes H2 than upstream of inlet portions of the nozzle holes H1. That is, the flow rate of fuel becomes higher in the radially outside-to-inside direction.

Taking such characteristics into account, the fuel jet adjusting plate 1 of this embodiment has the nozzle holes H1 arranged along the first circle C1 and nozzle holes H2 arranged along the second circle C2. The diameter D2 of the second nozzle holes H2 is smaller than the diameter D1 of the first nozzle holes H1.

Thus, despite the fact that fuel flows toward the central axis L0 at a lower rate upstream of inlet portions of the nozzle holes H2 than upstream of inlet portions of the nozzle holes H1, the fuel jet adjusting plate 1 can suitably atomize the fuel spray F1 injected through the first nozzle holes H1 and the fuel spray F2 injected through the second nozzle holes H2 without inhibiting fuel flow upstream of the inlet portions of the nozzle holes H1. Hence, deterioration of the performance of an internal combustion engine on which the fuel injection valve is mounted can be prevented, whereby the amount of HC emissions can be reduced.

Although the nozzle holes H1, H2 in the aforementioned embodiment have substantially circular cross section, those skilled in the art will understand that these holes H1, H2 may alternatively have a cross section of any other shape. Instead of setting the diameter D2 of the second nozzle holes H2 smaller than the diameter D1 of the first nozzle holes H1, an opening area of the nozzle holes H2 need only be smaller than that of the nozzle holes H1. Although the total number of the nozzle holes H1, H2 arranged along the circles C1, C2 in the aforementioned embodiment is twelve, the number of the nozzle holes provided is not specified. The invention only requires that a plurality of nozzles holes be arranged along two or more circles.

Figure 4:
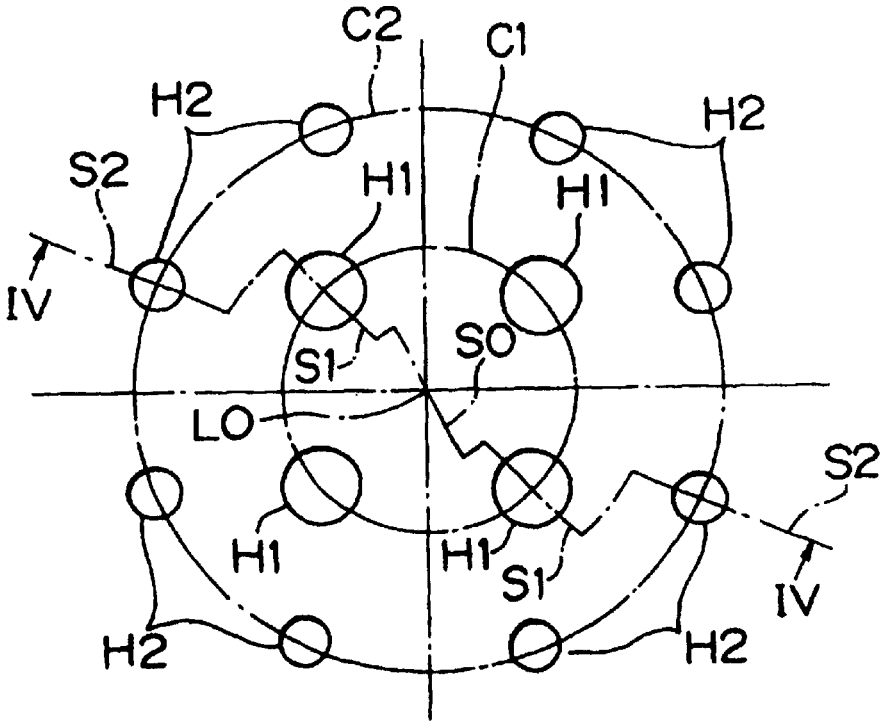
FIG. 4 is a partial plan view of the fuel injection valve according to a second embodiment of the present invention.
Figure 5:
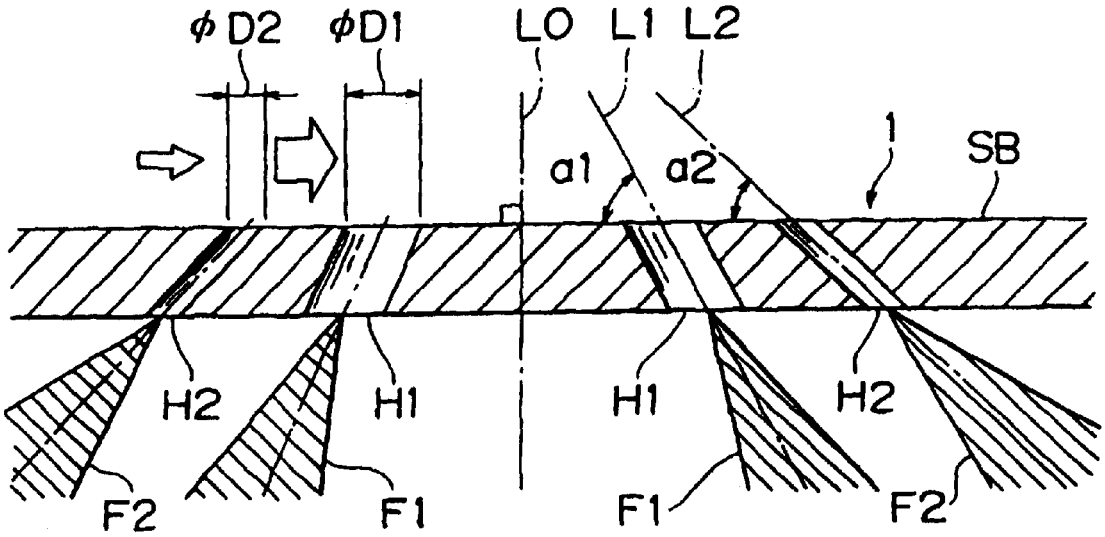
FIG. 5 is a sectional view taken along line IV—IV in FIG. 4.
Figure 6:
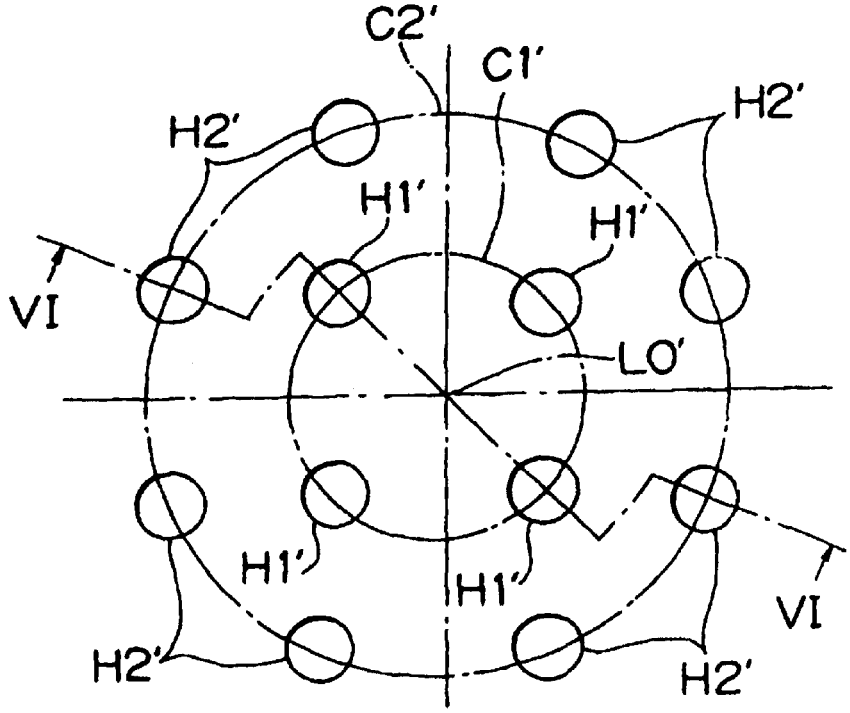
FIG.6 RELATED ART
FIG. 6 is a partial plan view of a fuel jet adjusting plate of a conventional fuel injection valve for an internal combustion engine.
Figure 7:
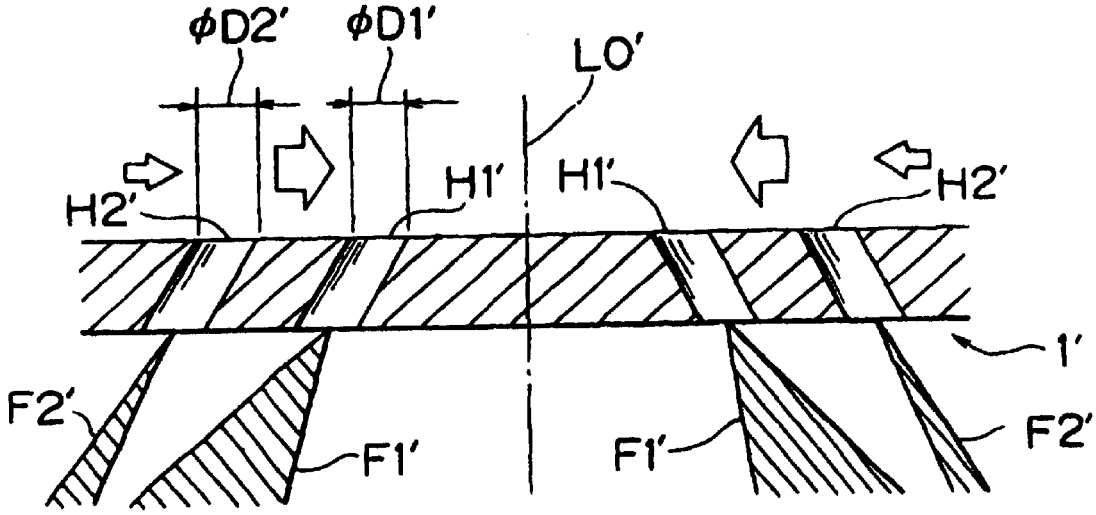
FIG.7 RELATED ART
FIG. 7 is a sectional view taken along line VI—VI in FIG. 6.

FIG. 4 is a partial plan view of a fuel injection valve according to a second embodiment of the present invention with a fuel jet adjusting plate obtained by making modifications to that of the first embodiment. FIG. 5 is a sectional view taken along line IV—IV in FIG. 4. In FIGS. 1, 2, 4 and 5, like components or parts are denoted by like reference characters. Referring now to FIGS. 4 and 5, a plane that is perpendicular to the central axis L0 is defined as a reference plane SB. The cross section as illustrated in FIG. 5 consists of a plane SO perpendicular to the reference plane SB and including the central axis L0, planes S1 perpendicular to the reference plane SB and including respective hole axes L1 of the nozzle holes H1, and planes S2 perpendicular to the reference plane SB and including respective hole axes L2 of the nozzle holes H2. The fuel jet adjusting plate 1 is formed as a slab.

As with the first embodiment, the valve body is disposed in an upper part of FIG. 5, namely, above the fuel jet adjusting plate 1. The valve body is driven by driving means (not shown) between an open position and a closed position. When the valve body assumes the open position, fuel supplied from top to bottom in FIG. 5 reaches a location immediately upstream of the fuel jet adjusting plate 1 and flows toward the central axis L0, that is, in a radially outside-to-inside direction (See blank arrows in FIG. 5). In this case, the fuel flows toward the central axis L0 at a lower rate upstream of inlet portions of the nozzle holes H2 than upstream of inlet portions of the nozzle holes H1. That is, the flow rate of fuel becomes higher in the radially outside-to-inside direction.

Hence, as with the first embodiment, the fuel jet adjusting plate 1 of this embodiment has nozzle holes H1 arranged along the first circle C1 and nozzle holes H2 arranged along the second circle C2. In addition, the diameter D2 of the second nozzle holes H2 is smaller than the diameter D1 of the first nozzle holes H1.

Thus, despite the fact that fuel flows toward the central axis L0 of the valve body at a lower rate upstream of the inlet portions of the nozzle holes H2 than upstream of the inlet portions of the nozzle holes H1, the fuel jet adjusting plate 1 can suitably atomize the fuel spray F1 injected through the first nozzle holes H1 and the fuel spray F2 injected through the second nozzle holes H2 without inhibiting fuel from flowing upstream of the inlet portions of the nozzle holes H1. Hence, preventing deterioration of the performance of an internal combustion engine on which the fuel injection valve is mounted, whereby the amount of HC emissions can be reduced.

Referring further to FIG. 5, in this embodiment, the respective hole axes L1 of the nozzle holes H1 form an acute angle a1 with the reference plane SB and the respective hole axes L2 of the nozzle holes H2 form an acute angle a2 with the reference plane SB. The acute angle a2 is smaller than the acute angle a1.

Hence, the fuel spray F1 injected through the nozzle holes H1 and the fuel spray F2 injected through the nozzle holes H2 are directed away from each other. Therefore, the fuel spray F1 injected through the nozzle holes H1 does not interfere with the fuel spray F2 injected through the nozzle holes H2. As a result, it is possible to stabilize the fuel spray injected through the respective nozzle holes and suitably atomize the injected fuel. In addition, despite the fact that fuel flows at a lower rate upstream of the inlet portions of the nozzle holes H2 than upstream of the inlet portions of the nozzle holes H1, the fuel spray F2 injected through the nozzle holes H2 can suitably be atomized. This is because the acute angle a2 is smaller than the acute angle a1.

While the present invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various element of the disclosed invention are shown in various combinations and configurations, which are exemplary, other combinations and configurations, including more, less or only a single element, are also within the spirit and scope of the invention.

What is claimed is:

1. A fuel injection valve for an internal combustion engine, comprising:

a valve body driven by a driving device between an open position and a closed position;

a fuel jet adjusting plate for atomizing fuel injected when the valve body assumes the open position;

a plurality of first nozzle holes formed in the fuel jet adjusting plate and arranged along a first circle coaxial with a central axis of the valve body; and a plurality of second nozzle holes formed in the fuel jet adjusting plate and arranged along a second circle coaxial with the central axis wherein a diameter of the second circle is larger than a diameter of the first circle, the second nozzle holes having an opening area smaller than an opening area of the first nozzle holes and wherein the valve [bodv] *body* is arranged so that, when the valve body assumes the open position, fuel flows across the fuel jet adjusting plate from a radially outer area toward the central axis.

2. The fuel injection valve according to claim 1, wherein each of the first nozzle holes extends through the fuel jet adjusting plate along a respective first hole axis and wherein a first acute angle is formed between the first hole axes and a plane of the fuel jet adjusting plate, each of the second nozzle holes extending through the fuel jet adjusting plate along a respective second hole axis and wherein a second acute angle is formed between the second hole axes and the plane of the fuel jet adjusting plate, the first and second angles being different from each other.

3. The fuel injection valve according to claim 2, wherein the second acute angles are smaller than the first acute angles.

* * * * *